United States Patent [19]

Yamaguchi

[11] Patent Number: 4,887,084

[45] Date of Patent: Dec. 12, 1989

[54] PRIORITY ENCODER

[75] Inventor: Seiji Yamaguchi, Hirakata, Japan

[73] Assignee: Matsushita Electric Industrial Co., Ltd., Osaka, Japan

[21] Appl. No.: 209,641

[22] Filed: Jun. 21, 1988

[30] Foreign Application Priority Data

Jun. 23, 1987 [JP] Japan .................. 62-155844

[51] Int. Cl.[4] ............................ H03M 1/36
[52] U.S. Cl. .................. 341/160; 341/157; 341/102
[58] Field of Search ........... 341/157, 160, 102, 50, 341/123, 143

[56] References Cited

U.S. PATENT DOCUMENTS 4,211,999 7/1980 Clark et al. ................. 341/160
4,584,567 4/1986 Kinghorn ................... 341/102
4,593,266 6/1986 Palmer ...................... 341/157
4,764,749 8/1988 Machida .................... 341/50

Primary Examiner—William M. Shoop, Jr.
Assistant Examiner—Helen Kim
Attorney, Agent, or Firm—Wenderoth, Lind & Ponack

[57] ABSTRACT

A priority encoder having MxN input lines and M output lines included M N-bit input priority encoder units, a precharging device, and a zero detecting device. Each N-bit input priority encoder unit includes an N-bit priority detecting device, a memory, a selector, a carry signal generating device, and a control device. The control device controls the output of the N-bit input prioroity encoder in accordance with the outputs of the N-bit priority detecting device and the carry signal generating device.

12 Claims, 3 Drawing Sheets

Fig. 3

| | | | | | | | | | | | | | | | | |
|---|---|---|---|---|---|---|---|---|---|---|---|---|---|---|---|---|
| X15 | 1 | 0 | 0 | 0 | 0 | 0 | 0 | 0 | 0 | 0 | 0 | 0 | 0 | 0 | 0 | 0 |
| X14 | x | 1 | 0 | 0 | 0 | 0 | 0 | 0 | 0 | 0 | 0 | 0 | 0 | 0 | 0 | 0 |
| X13 | x | x | 1 | 0 | 0 | 0 | 0 | 0 | 0 | 0 | 0 | 0 | 0 | 0 | 0 | 0 |
| X12 | x | x | x | 1 | 0 | 0 | 0 | 0 | 0 | 0 | 0 | 0 | 0 | 0 | 0 | 0 |
| X11 | x | x | x | x | 1 | 0 | 0 | 0 | 0 | 0 | 0 | 0 | 0 | 0 | 0 | 0 |
| X10 | x | x | x | x | x | 1 | 0 | 0 | 0 | 0 | 0 | 0 | 0 | 0 | 0 | 0 |
| X9 | x | x | x | x | x | x | 1 | 0 | 0 | 0 | 0 | 0 | 0 | 0 | 0 | 0 |
| X8 | x | x | x | x | x | x | x | 1 | 0 | 0 | 0 | 0 | 0 | 0 | 0 | 0 |
| X7 | x | x | x | x | x | x | x | x | 1 | 0 | 0 | 0 | 0 | 0 | 0 | 0 |
| X6 | x | x | x | x | x | x | x | x | x | 1 | 0 | 0 | 0 | 0 | 0 | 0 |
| X5 | x | x | x | x | x | x | x | x | x | x | 1 | 0 | 0 | 0 | 0 | 0 |
| X4 | x | x | x | x | x | x | x | x | x | x | x | 1 | 0 | 0 | 0 | 0 |
| X3 | x | x | x | x | x | x | x | x | x | x | x | x | 1 | 0 | 0 | 0 |
| X2 | x | x | x | x | x | x | x | x | x | x | x | x | x | 1 | 0 | 0 |
| X1 | x | x | x | x | x | x | x | x | x | x | x | x | x | x | 1 | 0 | 0 |
| X0 | x | x | x | x | x | x | x | x | x | x | x | x | x | x | x | 1 | 0 |
| z1 | 1 | 1 | 1 | 1 | 0 | 0 | 0 | 0 | 0 | 0 | 0 | 0 | 0 | 0 | 0 | 0 |
| z2 | x | x | x | x | 1 | 1 | 1 | 1 | 0 | 0 | 0 | 0 | 0 | 0 | 0 | 0 |
| z3 | x | x | x | x | x | x | x | x | 1 | 1 | 1 | 1 | 0 | 0 | 0 | 0 |
| z4 | x | x | x | x | x | x | x | x | x | x | x | x | 1 | 1 | 1 | 0 |
| c0 | 1 | 1 | 1 | 1 | 1 | 1 | 1 | 1 | 1 | 1 | 1 | 1 | 1 | 1 | 1 | 1 |
| c1 | 0 | 0 | 0 | 0 | 1 | 1 | 1 | 1 | 1 | 1 | 1 | 1 | 1 | 1 | 1 | 1 |
| c2 | 0 | 0 | 0 | 0 | 0 | 0 | 0 | 0 | 1 | 1 | 1 | 1 | 1 | 1 | 1 | 1 |
| c3 | 0 | 0 | 0 | 0 | 0 | 0 | 0 | 0 | 0 | 0 | 0 | 0 | 1 | 1 | 1 | 1 |
| w15 | 1 | 0 | 0 | 0 | 0 | 0 | 0 | 0 | 0 | 0 | 0 | 0 | 0 | 0 | 0 | 0 |
| w14 | 0 | 1 | 0 | 0 | 0 | 0 | 0 | 0 | 0 | 0 | 0 | 0 | 0 | 0 | 0 | 0 |
| w13 | 0 | 0 | 1 | 0 | 0 | 0 | 0 | 0 | 0 | 0 | 0 | 0 | 0 | 0 | 0 | 0 |
| w12 | 0 | 0 | 0 | 1 | 0 | 0 | 0 | 0 | 0 | 0 | 0 | 0 | 0 | 0 | 0 | 0 |
| w11 | x | x | x | x | 1 | 0 | 0 | 0 | 0 | 0 | 0 | 0 | 0 | 0 | 0 | 0 |
| w10 | x | x | x | x | 0 | 1 | 0 | 0 | 0 | 0 | 0 | 0 | 0 | 0 | 0 | 0 |
| w9 | x | x | x | x | 0 | 0 | 1 | 0 | 0 | 0 | 0 | 0 | 0 | 0 | 0 | 0 |
| w8 | x | x | x | x | 0 | 0 | 0 | 1 | 0 | 0 | 0 | 0 | 0 | 0 | 0 | 0 |
| w7 | x | x | x | x | x | x | x | x | 1 | 0 | 0 | 0 | 0 | 0 | 0 | 0 |
| w6 | x | x | x | x | x | x | x | x | 0 | 1 | 0 | 0 | 0 | 0 | 0 | 0 |
| w5 | x | x | x | x | x | x | x | x | 0 | 0 | 1 | 0 | 0 | 0 | 0 | 0 |
| w4 | x | x | x | x | x | x | x | x | 0 | 0 | 0 | 1 | 0 | 0 | 0 | 0 |
| w3 | x | x | x | x | x | x | x | x | x | x | x | x | 1 | 0 | 0 | 0 |
| w2 | x | x | x | x | x | x | x | x | x | x | x | 0 | 1 | 0 | 0 | 0 |
| w1 | x | x | x | x | x | x | x | x | x | x | x | 0 | 0 | 1 | 0 | 0 |
| w0 | x | x | x | x | x | x | x | x | x | x | x | 0 | 0 | 0 | 1 | 0 |
| en1 | 1 | 1 | 1 | 1 | 0 | 0 | 0 | 0 | 0 | 0 | 0 | 0 | 0 | 0 | 0 | 0 |
| en2 | 0 | 0 | 0 | 0 | 1 | 1 | 1 | 1 | 0 | 0 | 0 | 0 | 0 | 0 | 0 | 0 |
| en3 | 0 | 0 | 0 | 0 | 0 | 0 | 0 | 0 | 1 | 1 | 1 | 1 | 0 | 0 | 0 | 0 |
| en4 | 0 | 0 | 0 | 0 | 0 | 0 | 0 | 0 | 0 | 0 | 0 | 1 | 1 | 1 | 1 | 0 |
| y3 | 1 | 1 | 1 | 1 | 1 | 1 | 1 | 1 | 0 | 0 | 0 | 0 | 0 | 0 | 0 | z |
| y2 | 1 | 1 | 1 | 1 | 0 | 0 | 0 | 0 | 1 | 1 | 1 | 1 | 0 | 0 | 0 | z |
| y1 | 1 | 1 | 0 | 0 | 1 | 1 | 0 | 0 | 1 | 1 | 0 | 0 | 1 | 1 | 0 | z |
| y0 | 1 | 0 | 1 | 0 | 1 | 0 | 1 | 0 | 1 | 0 | 1 | 0 | 1 | 0 | 1 | z |
| Z | 0 | 0 | 0 | 0 | 0 | 0 | 0 | 0 | 0 | 0 | 0 | 0 | 0 | 0 | 0 | 1 |

4,887,084

PRIORITY ENCODER

BACKGROUND OF THE INVENTION

This invention relates to a priority encoder which is usable in a floating point processor or the like.

In a conventional priority encoder, when implementing a multi-input priority encoder in a semiconductor integrated circuit, a plurality of 4-bit or 8-bit priority encoders are used, and individual outputs (encode output and carry output) are connected to logic gates as inputs, so that the circuit composition is complicated. In the case of zero detection, for example, the carry signal generated by a 4-bit or 8-bit priority encoder progagates through each 4-bit or 8-bit priority encoder, and is thus most time-consuming, making it difficult to increase the operation speed.

SUMMARY OF THE INVENTION

It is hence a primary object of this invention to provide a priority encoder which can realize a high processing speed in zero detection and other operations in a relatively simple circuit construction for implementing a multi-input priority encoder usable in a floating point processor or the like in a semiconductor integrated circuit.

More particularly, this invention presents an nXm-bit ($m>1$, $n>1$; m, n are integers) priority encoder which has m priority encoder units of n-bit inputs, a precharging matter for precharging m carry signals generated in each n-bit input priority encoder unit, a zero detecting matter for detecting that all inputs of mXn bits are zero, an n-bit priority detector possessing a function for detecting that the n-bit priority encoder units have the priority in the upper bits of the n-bit (n being a small natural number) input and that all inputs of n bits are zero or inverted signals are all zero, memory means for reading out the data storing each output line except for zero detection signal of the n-bit priority detector as word line, selector for selecting the output lines of the memory means as outputs of nXm-bit priority encoder, carry signal generating means for generating carry signals for the portion of lower $nX(m-k)$ (k being a natural number smaller than m) bits, and control means for controlling the selector by the carry signals for the portion of upper $nX(k-1)$ bits and the zero detection signal of the n-bit priority detector.

In this constitution, it becomes possible to provide a priority encoder having a fast processing speed of zero detection or the like and a large number of input bits, in a relatively simple circuit structure capable of being implemented into a semiconductor integrated circuit.

While the novel features of the invention are set forth in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3 is an explanatory chart showing the truth values of the circuit of FIG. 2.

DETAILED DESCRIPTION OF THE INVENTION

Figure 1:
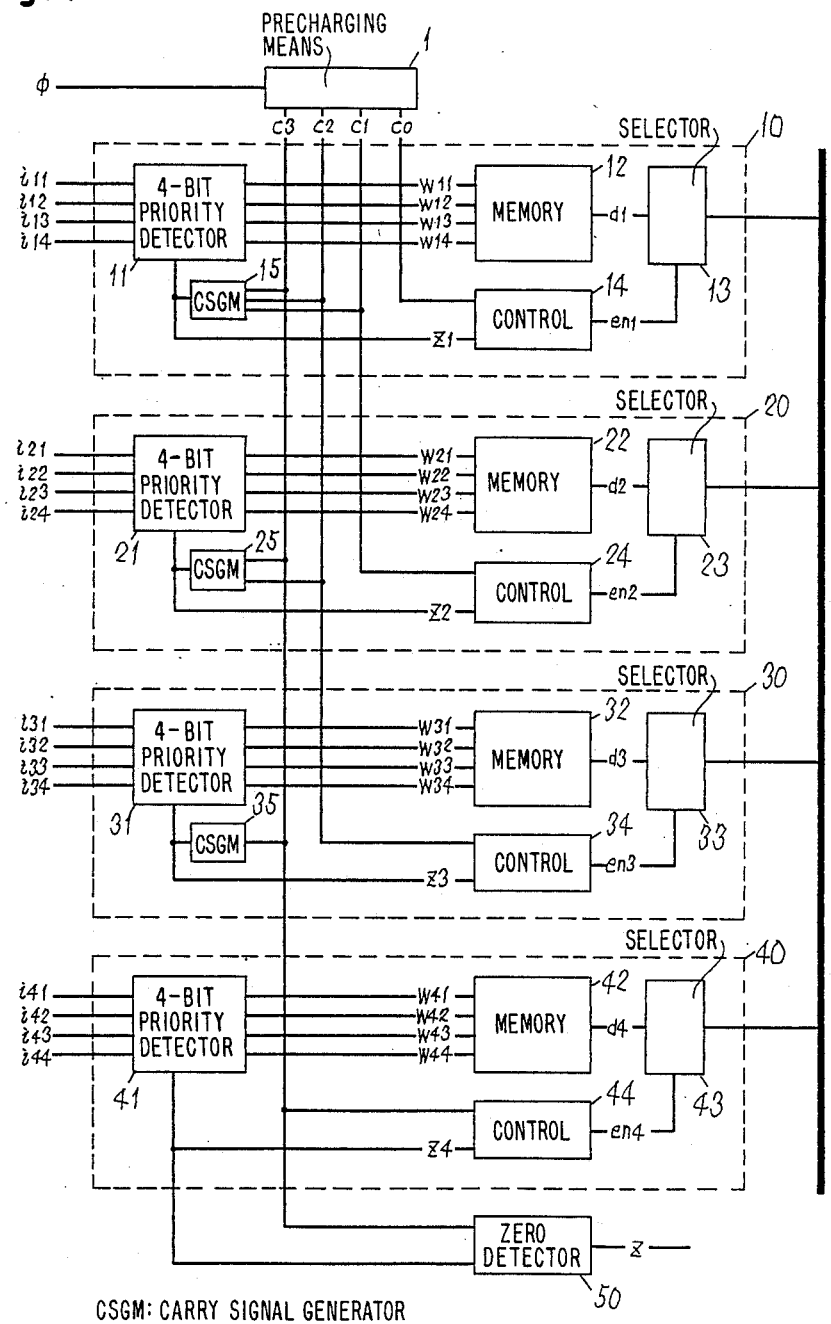
FIG. 1 is a block diagram showing a structure of a priority encoder as one embodiment of this invention.

FIG. 1 shows a priority encoder having a 4×4 bit organization, in which numeral 1 is a precharging means for generating carry signals; 10, 20, 30, 40 are 4-bit priority encoder units; 11, 21, 31, 41 are 4-bit priority detectors possessing a zero detecting function; 12, 22, 32, 42 are memory means having a 4-word organization; 13, 23, 33, 43 are selectors; 14, 24, 34, 44 are control means for determining whether or not to select the selectors; 15, 25, 35 are carry signal generating means for showing the state of upper bits; and 50 is a zero detecting means.

The operation of the priority encoder unit 10 is briefly described below. Input signals $i11$, $i12$, $i13$, $i14$ are fed into the 4-bit priority detector 11, and when $i11$ is "Hight" (H), a word line $w11$ is set to H, word lines $w12$, $w13$, $w14$ to "Low" (L), and a zero detection signal $z1$ to H.

When $i11$ is L and $i12$ is H, the word line $w12$ is set to H, the word lines $w11$, $w13$, $w14$ to L, and the zero detection signal $z1$ to H. When $i11$ and $i12$ are L and $i13$ is H, the word line $w13$ is set to H, the word lines $w11$, $w12$, $w14$ to L, and the zero detection signal $z1$ to H.

When $i11$, $i12$, $i13$ are L and $i14$ is H, the word line $w14$ is set to H, and the word lines $w11$, $w12$, $w13$ to L, and the zero detection signal $z1$ to H. When $i11$, $i12$, $i13$, $i14$ are all L, the word lines $w11$, $w12$, $w13$, $w14$ are set to L, and the zero detection signal $z1$ to L.

Accordingly, at the 4-bit priority detector 11, depending on the state of input signals $i11$, $i12$, $i13$, $i14$, one of the word lines $w11$, $w12$, $w13$, $w14$ is always H except when all inputs are zero, and the zero detection signal $z1$ becomes also H. When all inputs are zero, all the outputs of word lines $w11$, $w12$, $w13$, $w14$ and zero detection signal $z1$ become L.

The word lines $w11$, $w12$, $w13$, $w14$ generated by the 4-bit priority detector 11 are connected to the memory means 12 thereby composing each word line of the memory means 12. Depending on the selected word line, the memory content D1 is read out, and is transferred to the selector 13. The selector 13 determines whether to deliver the content D1 read out from the memory means 12 or to set in high impedance state, depending on the output signal en1 of the control means 14.

The output signal en1 of the control means 14 is determined by the carry signal $c0$ showing the zero detection signal $z1$ and the upper bit state of the 4-bit priority detector 11, and when $c0$ is H and $z1$ is also H, en1 is H, and the selector 13 is set in selecting state, and the content D1 read out from the memory means 12 becomes the output of the priority encoder. That is, when all upper bits are zero, the carry signal $c0$ keeps the precharge state (H), and also when H is present in at least one of the bits to be processed, the selector 13 is set in selecting state, and the content D1 read out from the memory means 12 becomes the output of the priority encoder.

On the other hand, as for zero detection, for example, in order to process parallel in the unit of every 4 bits, generation is made from the zero detection signal of the lowest position, and the carry signal fed into the priority encoder unit at the lowest position.

The priority encoder unit 20 operates similarly to the unit 10, but the connected carry signal is somewhat different as further described below.

Of the carry signals c0, c1, c2, c3, those related with the priority encoder unit 20 are c1, c2, c3. The carry signal c1 judges if all input signals of the priority encoder unit 10 are zero or not. That is, if all input signals of the priority encoder unit 10 are zero, z1 is L, so that the c1 keeps the precharge state and is H. Therefore, if only one of the input signals of the priority encoder unit 20 is H, z2 becomes H, and hence en2 is H, so that the content stored in the priority encoder unit 20 becomes the output of the priority encoder. If all inputs of priority encoder unit 20 are zero, z2 is L, and en2 is L, so that the lower priority encoder unit is set in selecting state.

A multi-input priority encoder may be composed by arranging a plurality of thus composed priority encoder units.

Figure 2:
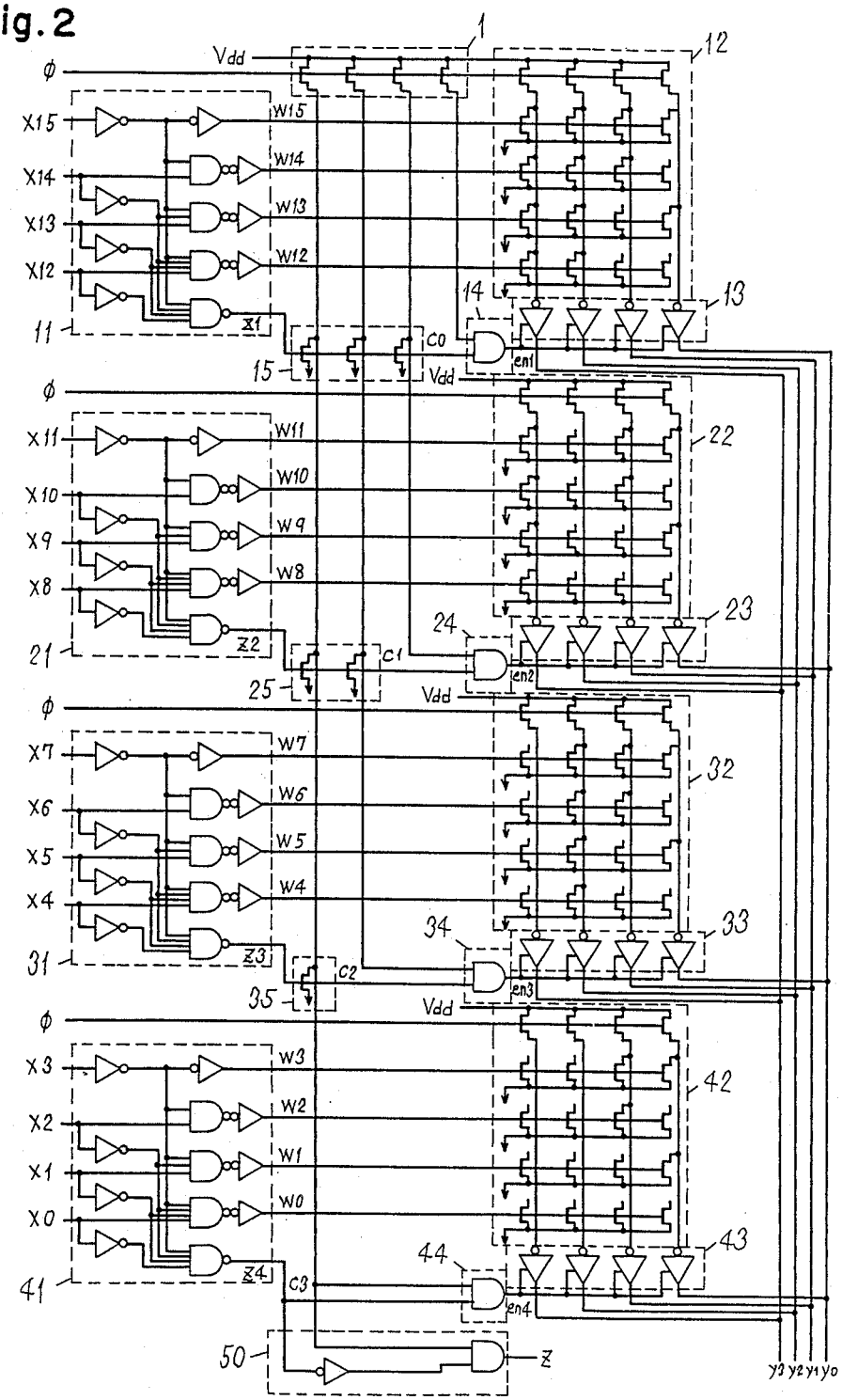
FIG. 2 is a circuit diagram showing an example of a practical circuit structure in 16 bits of the priority encoder.

FIG. 2 is a practical circuit diagram of a 16-bit priority encoder composed using four 4-bit priority encoder units, which shows the use of read only memory (ROM) of 4-bit×4-word organization as the memory device, in a synchronous formula using clock $\phi$. In FIG. 2, x0, x1, ..., x15 are input signals; w0, w1, ..., w15 are word lines of ROM; z1, z2, z3, z4 are zero detection signals of each 4-bit unit priority encoder unit; and c0, c1, c2, c3 are carry signals showing the state of upper 4-bit priority encoder unit. From x15, x14, x13, x12, word lines w15, w14, w13, w12, and zero detection signal z1 are generated. From x11, x10, x9, x8, word lines w11, w10, w9, w8, and zero detection signal z2 are generated. From x7, x6, x5, x4, word lines w7, w6, w5, w4, and zero detection signal z3 are generated. From x3, x2, x1, x0, word lines w3, w2, w1, w0, and zero detection signal z0 are generated. When all inputs of x15, ..., x1, x0 are other than zero, only one is selected from word lines w15, ..., w1, w0, and the stored content is taken out as the output to the priority encoder. When all inputs of x15, ..., x1, x0 are zero, one of the word lines is selected. As a result, the output value becomes a high impedance state, and z becomes H. Hence, zero is detected.

In FIG. 2, clock $\phi$ comes in precharge state in half cycle, and is in active state in the other half cycle. That is, clock $\phi$ is, in the first half cycle, responsible for precharging action of the precharging matter 1 composed of memory device and dynamic circuit, and carry generating means 15, 25, 35, and, in the second half cycle, responsible for predecoding of input, selection of word line, generation of carry signal, reading of data, generation of enable signal, and transfer of output signal. In this way, the priority encoder can be operated by one clock. At the same time, zero detection is realized.

FIG. 3 is an explanatory chart showing truth values in the operating state in FIG. 2. In FIG. 3, the reference symbol 1 denotes H, 0 denotes L, x denotes an unstable state, and z denotes a high impedance state.

According to this invention, it is possible to compose a priority encoder processing at a high speed and having many bits in a relatively simple circuit composition for implementing into a semiconductor integrated circuit as described herein. In this invention, moreover, since the encoded output value is stored in the memory device, the output value of the encoder may be made programmable by using a reloadable memory device.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

We claim:

1. A priority encoder comprising:
   M×N input lines, wherein M and N are integers having a value greater than 1;
   M N-bit input priority encoder units;
   a precharging means for precharging M carry signals on M carry lines; and
   a zero detecting means, coupled to said M N-bit input priority encoder units, for detecting when all of said M×N input lines are at a low signal level;
   wherein a K-th N-bit input priority encoder unit, K being an integer from 1 to M, includes:
   (a) an N-bit priority detecting means, coupled to N input lines and having N word lines and one zero detection line, for outputting a high signal level on said zero detection line when all of said N input lines are at said low signal level, and for outputting a low signal level on said zero detection line when at least one of said N input lines is at said high signal level, and for outputting a high signal level on one of said N word lines which corresponds to a highest priority designated input line having a high signal level, and for outputting a low signal level on the remaining of said N word lines;
   (b) a memory means coupled to said N word lines for storing signals output from said N-bit priority detecting means on said N word lines;
   (c) a selector coupled to said memory means for selecting and outputting an output value from said memory means;
   (d) a carry signal generating means coupled to said zero detection line for generating the (K+1)-th through the M-th carry signals of said M carry signals; and
   (e) a control means, coupled to said zero detection line and said selector and one of said M carry lines, for controlling said selector in accordance with a signal on said zero detection line and the K-th carry signal of said M carry signals.

2. A priority encoder according to claim 1, wherein said precharging means is composed of m P-channel MOSFETs.

3. A priority encoder according to claim 1, wherein said memory means is composed of read only memory.

4. A priority encoder according to claim 1, wherein said memory means is composed of read only memory so as to operate by using a clock in said precharging matter.

5. A priority encoder according to claim 1, wherein said memory means is composed of random access memory.

6. A priority encoder according to claim 1, wherein said memory means is composed of random access memory so as to operate by a clock used in said precharging means.

7. A priority encoder according to claim 1, wherein said selector is changed to a selecting state when the output of said control means is set, and to a high impedance state when the output of said control means is not set.

8. A priority encoder according to claim 1, wherein said memory means is designed to operate by using the same clock as the precharging means.

9. A priority encoder according to claim 1, wherein said precharging means is composed of M P-channel MOSFETs, the sources of said M P-channel MOSFETs being connected to a power supply line and the drains of said M P-channel MOSFETs being connected to carry lines respectively, and the gates of said M P-channel MOSFETs operating in synchronism with a clock signal of a common clock.

10. A priority encoder according to claim 1, wherein the carry signal generating means of the K-th priority encoder unit is composed of (M-K) N-channel MOSFETs, the gates of said (M-K) N-channel MOSFETs being commonly connected to the zero detection signal of the K-th N-bit priority detecting means, the sources of the (M-K) N-channel MOSFETs being connected to a grounding wire, and the drains of the (M-K) N-channel MOSFETs being connected to the (K+1)-th through the M-th carry lines.

11. A priority encoder according to claim 1, wherein the control means of the K-th priority encoder unit includes an AND gate having as inputs the zero detection signal of the N-bit priority detection means of the K-th priority encoder unit and the K-th carry line.

12. A priority encoder according to claim 1, wherein the zero detecting means includes an AND gate having as inputs the inverted signal of the zero detection signal of the N-bit priority detecting means of the M-th priority encoder unit and the M-th carry signal.

* * * * *